(12) United States Patent
Hirano

(10) Patent No.: US 10,281,006 B2
(45) Date of Patent: May 7, 2019

(54) PLANETARY GEAR MECHANISM

(71) Applicant: AISIN AW CO., LTD., Anjo-shi, Aichi-ken (JP)

(72) Inventor: Takahisa Hirano, Anjo (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 0 days.

(21) Appl. No.: 15/537,742

(22) PCT Filed: Jan. 26, 2016

(86) PCT No.: PCT/JP2016/052102
§ 371 (c)(1),
(2) Date: Jun. 19, 2017

(87) PCT Pub. No.: WO2016/136356
PCT Pub. Date: Sep. 1, 2016

(65) Prior Publication Data
US 2018/0010668 A1    Jan. 11, 2018

(30) Foreign Application Priority Data
Feb. 26, 2015    (JP) .................................. 2015-037188

(51) Int. Cl.
*F16H 1/28* (2006.01)
*F16H 57/08* (2006.01)
(Continued)

(52) U.S. Cl.
CPC .............. *F16H 1/28* (2013.01); *B60K 17/28* (2013.01); *B60K 25/06* (2013.01); *F16H 37/02* (2013.01);
(Continued)

(58) Field of Classification Search
CPC ...................................................... F16H 57/082
See application file for complete search history.

(56) References Cited

U.S. PATENT DOCUMENTS 3,527,121 A * 9/1970 Moore .................. F16H 57/082
475/282
6,746,354 B1    6/2004 Ziemer
(Continued)

FOREIGN PATENT DOCUMENTS

DE    10 2010 033364 A1    12/2011
JP    62-65134 U    4/1987
(Continued)

OTHER PUBLICATIONS

International Search Report of PCT/JP2016/052102 dated May 10, 2016 [PCT/ISA/210].

*Primary Examiner* — Derek D Knight
(74) *Attorney, Agent, or Firm* — Sughrue Mion, PLLC

(57) ABSTRACT

A planetary gear mechanism is desired in which pinion gears can be inserted between support portions on both sides in the axial direction of the pinion gears after the support portions on both sides in the axial direction of the pinion gears are coupled together. In this planetary gear mechanism, a coupling inner portion of a carrier coupling portion is located between a first sun gear and a second sun gear in the axial direction, and a carrier and the carrier coupling portion are formed so that each pinion gears can be inserted between a first shaft support portion and a second shaft support portion in the axial direction from the outside in the radial direction.

18 Claims, 11 Drawing Sheets

(51) Int. Cl.
  *B60K 17/28* (2006.01)
  *B60K 25/06* (2006.01)
  *F16H 37/02* (2006.01)
  B60K 6/365 (2007.10)
  B60K 6/48 (2007.10)

(52) U.S. Cl.
  CPC ........... *F16H 57/08* (2013.01); *F16H 57/082* (2013.01); *B60K 6/365* (2013.01); *B60K 6/48* (2013.01); *B60Y 2200/92* (2013.01); *Y02T 10/6221* (2013.01); *Y10S 903/91* (2013.01)

(56) References Cited

U.S. PATENT DOCUMENTS

| | | | |
|---|---|---|---|
| 7,654,929 B2* | 2/2010 | Kimes | F16H 57/082 |
| | | | 475/331 |
| 8,187,141 B2* | 5/2012 | Goleski | F16H 57/082 |
| | | | 475/331 |
| 2005/0130790 A1 | 6/2005 | Nasu et al. | |

FOREIGN PATENT DOCUMENTS

| | | |
|---|---|---|
| JP | 04-128556 U | 11/1992 |
| JP | 06-14598 U | 2/1994 |
| JP | 2003-500598 A | 1/2003 |
| JP | 2004-183835 A | 7/2004 |
| JP | 2005-155868 A | 6/2005 |

* cited by examiner

PLANETARY GEAR MECHANISM

CROSS REFERENCE TO RELATED APPLICATIONS

This application is a National Stage of International Application No. PCT/JP2016/052102, filed Jan. 26, 2016, claiming priority based on Japanese Patent Application No. 2015-037188, filed Feb. 26, 2015, the contents of all of which are incorporated herein by reference in their entirety.

TECHNICAL FIELD

The present disclosure relates to planetary gear mechanisms including a first sun gear and a second sun gear which are arranged side by side in the axial direction, a plurality of pinion gears that mesh with both the first sun gear and the second sun gear, and a carrier that supports the plurality of pinion gears.

BACKGROUND ART

For example, a technique described in Patent Document 1 below is known regarding such planetary gear mechanisms. In the technique of Patent Document 1, a carrier coupling portion extends radially outside pinion gears so as to be coupled to a fourth coupling member, and extends radially inside the pinion gears so as to be coupled to be coupled to a third coupling member. The carrier coupling portion has columnar insertion holes for the pinion gears to be inserted therethrough. With the pinion gears being inserted through the insertion holes, both axial ends of the pinion gears are supported by a carrier.

RELATED ART DOCUMENTS

Patent Documents

Patent Document 1: Japanese Patent Application Publication No. 2005-155868 (JP 2005-155868 A)

SUMMARY

Since pinion gears rotate at high speeds, it is desirable that the pinion gears have high axis accuracy. In order for the pinion gears to have high axis accuracy, it is necessary to increase machining accuracy, including the relative positional relationship, of support portions supporting shafts of the pinion gears from both sides in the axial direction. Specifically, it is desirable to machine the support portions on both sides in the axial direction after coupling the support portions on both sides in the axial direction and fixing the relative positional relationship therebetween. In the technique of Patent Document 1, however, since the pinion gears are inserted through the insertion holes formed in the carrier coupling portion, the member of the carrier coupling portion is present radially outside the pinion gears along the entire circumference. Accordingly, the pinion gears cannot be inserted into the space between the support portions on both sides in the axial direction after the support portions on both sides in the axial direction are coupled together.

A planetary gear mechanism is therefore desired in which pinion gears can be inserted between support portions for pinion gears which are located on both sides in the axial direction after the support portions on both sides in the axial direction are coupled together.

Means for Solving the Problem

In view of the above, a planetary gear mechanism including a first sun gear and a second sun gear which are arranged side by side in an axial direction, a plurality of pinion gears that mesh with both the first sun gear and the second sun gear, a carrier that supports the plurality of pinion gears, and a carrier coupling portion that supports the plurality of pinion gears and is coupled to the carrier, wherein the carrier coupling portion includes a first shaft support portion, a coupling outer portion that is a portion located on an outer side in a radial direction of the carrier with respect to the plurality of pinion gears, and a coupling inner portion that is a portion located on an inner side in the radial direction with respect to the plurality of pinion gears, each of the coupling outer portion and the coupling inner portion is coupled to other member, the first shaft support portion is located on a first side in the axial direction, which is one side in the axial direction, with respect to the pinion gears and supports shafts of the plurality of pinion gears, the carrier includes a second shaft support portion, the second shaft support portion is located on a second side in the axial direction, which is the other side in the axial direction, with respect to the pinion gears and supports the shafts of the plurality of pinion gears, the coupling inner portion is located between the first sun gear and the second sun gear in the axial direction, and the carrier and the carrier coupling portion are formed so that the pinion gears can be inserted between the first shaft support portion and the second shaft support portion in the axial direction from outside in the radial direction.

The shafts of the pinion gears are supported from both sides in the axial direction by the first shaft support portion of the carrier coupling portion and the second shaft support portion of the carrier. In order to improve axis accuracy of the shafts of the pinion gears, it is necessary to increase machining accuracy, including the relative positional relationship, of the first shaft support portion and the second shaft support portion. In order to increase the machining accuracy, it is desirable to machine the first shaft support portion and the second shaft support portion after coupling the carrier coupling portion and the carrier.

With the above characteristic configuration, the pinion gears can be inserted from the radially outer side into a placement space for the pinion gears which is formed between the first shaft support portion and the second shaft support portion.

Accordingly, the first shaft support portion and the second shaft support portion can be machined by a single machining process after the carrier coupling portion and the carrier are coupled together, whereby high axis accuracy of the pinion gears can be ensured.

With the above characteristic configuration, the coupling inner portion of the carrier coupling portion is located between the first sun gear and the second sun gear in the axial direction. Accordingly, the carrier coupling portion can be extended toward the radially inner side with respect to the pinion gears. Moreover, the first sun gear can be coupled to other member disposed on the one side in the axial direction with respect to the first sun gear, and the second sun gear can be coupled to other member disposed on the other side in the axial direction with respect to the second sun gear.

DETAILED DESCRIPTION OF THE PREFERRED EMBODIMENTS

1. First Embodiment

Figure 1:
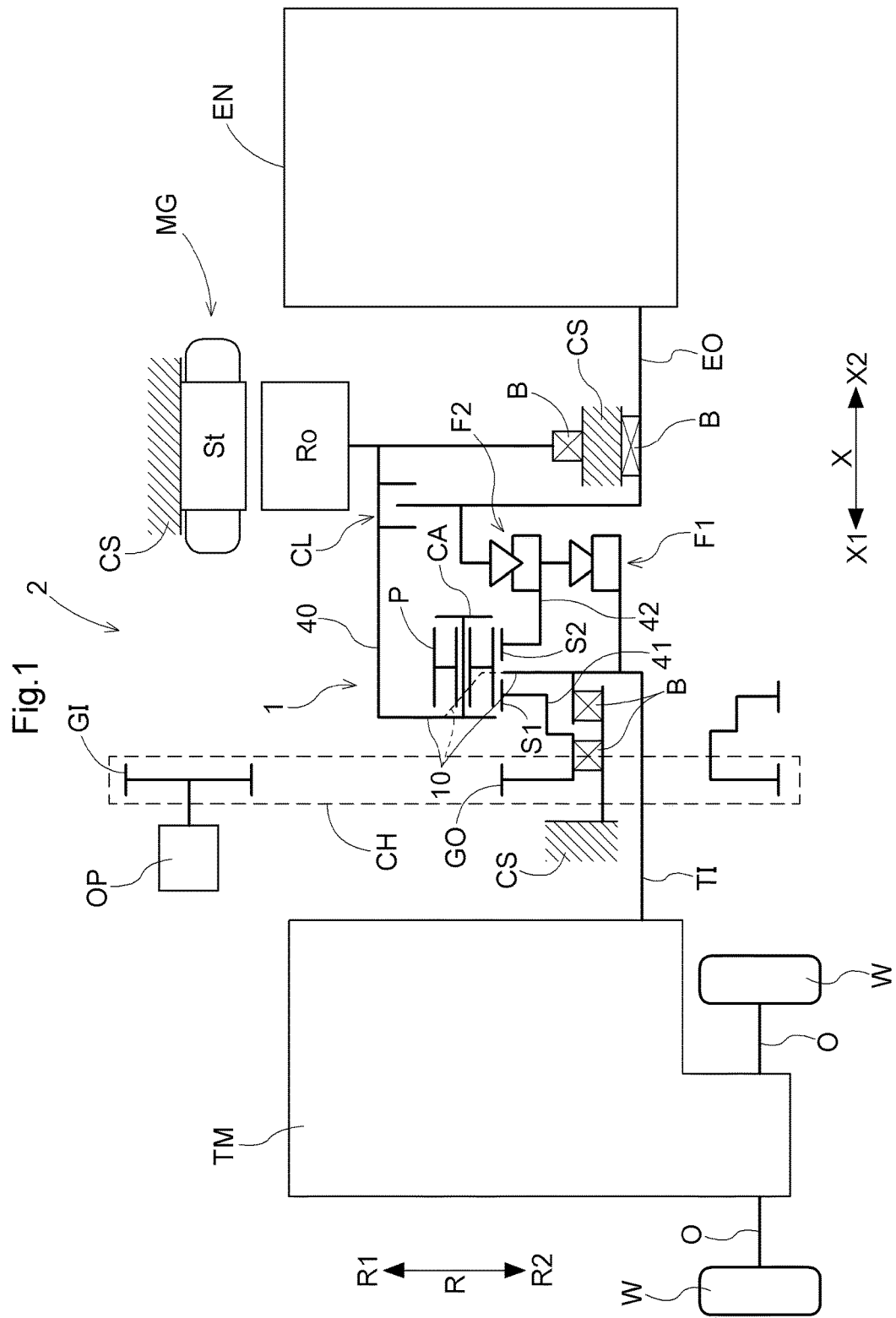
FIG. 1 is a skeleton diagram showing the general configuration of a vehicle drive device having a planetary gear mechanism according to a first embodiment incorporated therein.

A first embodiment of a planetary gear mechanism 1 will be described with reference to the drawings.

The planetary gear mechanism 1 includes: a first sun gear S1 and a second sun gear S2 which are arranged side by side in the axial direction X; a plurality of pinion gears P that mesh with both the first sun gear S1 and the second sun gear S2; a carrier CA that supports the plurality of pinion gears P; and a carrier coupling portion 10 that supports the plurality of pinion gears P and is coupled to the carrier CA. The carrier coupling portion 10 includes a coupling outer portion 14 that is a portion extending on the radially outer side R1 with respect to the plurality of pinion gears P, and a coupling inner portion 12 that is a portion extending on the radially inner side R2 with respect to the plurality of pinion gears P. Each of the coupling outer portion 14 and the coupling inner portion 12 is coupled to other member.

In the present embodiment, a vehicle drive device 2 has the planetary gear mechanism 1 incorporated therein.

The direction parallel to the rotation axis SC (see FIG. 4) of the carrier CA (carrier coupling portion 10) is herein defined as the axial direction X. One side in the axial direction X is defined as the first side X1 in the axial direction, and the other side in the axial direction X, namely the opposite side from the first side X1 in the axial direction, is defined as the second side X2 in the axial direction. When simply referring to the radial direction R or the circumferential direction C, it means the radial direction R or the circumferential direction C of the carrier CA (specifically, about the rotation axis SC of the carrier CA). The inner side in the radial direction R of the carrier CA is herein referred to as the radially inner side R2, and the outer side in the radial direction R of the carrier CA is referred to as the radially outer side R1.

1-1. Vehicle Drive Device 2

As shown in FIG. 1, the vehicle drive device 2 has the planetary gear mechanism 1 incorporated therein. The vehicle drive device 2 is a drive device for hybrid vehicles which includes an internal combustion engine EN and a rotating electrical machine MG as driving force sources that drive wheels W. The internal combustion engine EN is a heat engine that is driven by fuel combustion. For example, various known engines such as a gasoline engine and a diesel engine are used as the internal combustion engine EN. The rotating electrical machine MG has a stator St fixed to a case CS accommodating the vehicle drive device 2, and a rotor Ro rotatably supported on the radially inner side R2 with respect to the stator St.

The carrier coupling portion 10 is one of members that transmit the driving force of the driving force source toward the wheels W. The carrier coupling portion 10 is a member extending at least in the radial direction R. The end on the radially outer side R1 of the carrier coupling portion 10 is coupled to the driving force source side, and the end on the radially inner side R2 of the carrier coupling portion 10 is coupled to the wheel W side. In the present embodiment, the driving force of the driving force source is transmitted to the radially inner side R2 through the carrier coupling portion 10 and is transmitted to an input shaft TI of a shift device TM.

The vehicle drive device 2 includes a rotor support member 40 that supports the rotor Ro of the rotating electrical machine MG and the end on the radially outer side R1 of the carrier coupling portion 10 is coupled to the rotor support member 40. The vehicle drive device 2 includes the shift device TM, and the end on the radially inner side R2 of the carrier coupling portion 10 is coupled to the input shaft TI of the shift device TM. An output shaft EO of the internal combustion engine EN is structured to be coupled to the rotor support member 40 via a clutch CL. In the present embodiment, the clutch CL is a friction engagement device. When the clutch CL is in an engaged state, the output shaft EO of the internal combustion engine EN is coupled to the rotor support member 40, so that the driving force of the internal combustion engine EN can be transmitted toward the wheels W. When the clutch CL is in a disengaged state, the output shaft EO of the internal combustion engine EN is decoupled from the rotor support member 40, so that the driving force of the internal combustion engine EN is not transmitted toward the wheels W. Each part of the vehicle drive device 2 is supported so as to be rotatable relative to the case CS via a bearing B.

The vehicle drive device 2 includes an oil pump OP. Oil discharged from the oil pump OP is supplied to each part of the vehicle drive device 2 such as the shift device TM, the clutch CL, and the rotating electrical machine MG The oil pump OP is structured to be driven with the driving force of the driving force source. In the present embodiment, the planetary gear mechanism 1 is a transmission mechanism that transmits the driving force of the driving force source toward the oil pump OP. The first sun gear S1 is coupled via a first coupling member 41 to an output gear GO, which is disposed on the first side X1 in the axial direction of the first sun gear S1, so as to rotate with the output gear GO. The output gear GO is coupled to a drive gear GI of the oil pump OP via a chain CH. The driving force is thus transmitted from the first sun gear S1 to the oil pump OP via a power transmission mechanism such as the output gear GO, the chain CH, and the drive gear GI.

The power transmission mechanism for the oil pump OP will be described in more detail below. The power transmission mechanism includes the output gear GO, the drive gear GI disposed on the radially outer side R1 with respect to the output gear GO and coupled to the oil pump OP, and the chain CH looped around the output gear GO and the drive gear GI. The output gear GO is disposed on the opposite side in the axial direction X of the first sun gear S1 from the second sun gear S2. In the present embodiment, the output gear GO is disposed on the first side X1 in the axial direction of the first sun gear S1. The output gear GO is coupled to the first sun gear S1. The chain CH is disposed adjacent to the carrier coupling portion 10 in the axial direction X. In the present embodiment, the chain CH is disposed on the first side X1 in the axial direction with respect to the carrier coupling portion 10 so as to be adjacent to the carrier coupling portion 10. Only the first sun gear S1 and the second sun gear S2 mesh with the pinion gears P. Accordingly, the driving force transmitted to the second sun gear S2 is transmitted from the second sun gear S2 to the pinion gears P, the first sun gear S1, the output gear GO, the chain CH, and the oil pump OP in this order.

The second sun gear S2 is structured to be coupled to the carrier coupling portion 10 via a first one-way clutch F1 and to be coupled to the output shaft EO of the internal combustion engine EN via a second one-way clutch F2. Specifically, the second sun gear S2 is coupled to a cylindrical second coupling member 42, which extends from the second sun gear S2 toward the second side X2 in the axial direction, so as to rotate together with the second coupling member 42. The outer peripheral surface of the second coupling member 42 is coupled to the second one-way clutch F2, and the inner peripheral surface of the second coupling member 42 is coupled to the first one-way clutch F1. The direction in which the first one-way clutch F1 restricts the carrier coupling portion 10 from rotating relative to the second sun gear S2 is the same as the direction in which the second one-way clutch F2 restricts the output shaft EO of the internal combustion engine EN from rotating relative to the first sun gear S1. Due to the function of the first and second one-way clutches F1, F2, the second sun gear S2 rotates at the same speed as one of the carrier coupling portion 10 and the output shaft EO of the internal combustion engine EN which rotates at a higher speed. Accordingly, when the clutch CL is in a disengaged state, the second sun gear S2 rotates at the same speed as one of the rotating electrical machine MG and the internal combustion engine EN which rotates at a higher speed.

When the clutch CL is in an engaged state, the rotating electrical machine MG (carrier coupling portion 10) and the internal combustion engine EN rotate at the same speed, the carrier coupling portion 10 and the second sun gear S2 rotate at the same speed. Accordingly, the pinion gears P do not rotate but revolve at the same speed as the carrier coupling portion 10.

As a result, the first sun gear S1 rotates at the same speed as the carrier coupling portion 10.

When the clutch CL is in a disengaged state and the rotational speed of the rotating electrical machine MG is higher than that of the internal combustion engine EN, the first one-way clutch F1 is engaged and the second sun gear S2 rotates at the same speed as the rotating electrical machine MG (carrier coupling portion 10). Accordingly, the pinion gears P do not rotate but revolve at the same speed as the carrier coupling portion 10. As a result, the first sun gear S1 rotates at the same speed as the carrier coupling portion 10.

When the clutch CL is in a disengaged state and the rotational speed of the internal combustion engine EN is higher than that of the rotating electrical machine MG (carrier coupling portion 10), the second one-way clutch F2 is engaged and the second sun gear S2 rotates at the same speed as the internal combustion engine EN. Accordingly, the pinion gears P revolve at the same speed as the carrier coupling portion 10 while rotating at a speed corresponding to the difference in rotational speed between the internal combustion engine EN and the carrier coupling portion 10. As a result, the first sun gear S1 rotates at the same speed as the internal combustion engine EN.

The first sun gear S1 is thus rotated at the same speed as one of the rotating electrical machine MG and the internal combustion engine EN which rotates at a higher speed, and the oil pump OP drivingly coupled to the first sun gear S1 via the power transmission mechanism is driven to rotate.

1-2. Planetary Gear Mechanism 1

The planetary gear mechanism 1 includes: the first sun gear S1 and the second sun gear S2 which are arranged side by side in the axial direction X; the plurality of pinion gears P that mesh with both the first sun gear S1 and the second sun gear S2; the carrier CA that supports the plurality of pinion gears P; and the carrier coupling portion 10 that is coupled to the carrier CA. The pinion gears P are what are called planetary gears. In the present embodiment, the planetary gear mechanism 1 includes three pinion gears P, and the three pinion gears P are arranged at regular intervals in the circumferential direction C. The plurality of pinion gears P need not necessarily be arranged at regular intervals in the circumferential direction C.

Figure 5:
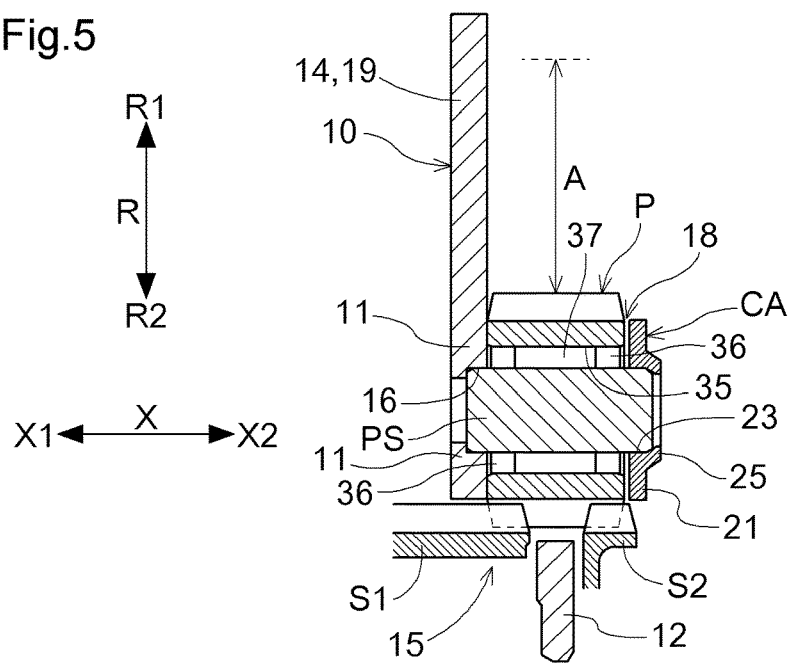
FIG. 5 is a sectional view of the planetary gear mechanism according to the first embodiment taken along a plane passing through the rotation axis of a carrier coupling portion and a pinion gear.

As shown in FIG. 5 etc., the carrier coupling portion 10 includes first shaft support portions 11, and the first shaft support portions 11 are disposed on the first side X1 in the axial direction with respect to the pinion gears P and support shafts PS of the plurality of pinion gears P. The carrier CA includes second shaft support portions 21, and the second shaft support portions 21 are disposed on the second side X2 in the axial direction with respect to the pinion gears P and support the shafts PS of the plurality of pinion gears P (hereinafter referred to as the pinion shafts PS).

Since the pinion gears P of the planetary gear mechanism 1 rotate at high speeds, it is desirable that the pinion shafts PS have high axis accuracy. In the present embodiment, the pinion shafts PS are supported from both sides in the axial direction X by the first shaft support portions 11 of the carrier coupling portion 10 and the second shaft support portions 21 of the carrier CA. Accordingly, in order to improve the axis accuracy of the pinion shafts PS, it is necessary to increase machining accuracy of first contact surfaces of the first shaft support portions 11 which contact the pinion shafts PS (in this example, the inner peripheral surfaces of first fitting holes 16) and second contact surfaces of the second shaft support portions 21 which contact the pinion shafts PS (in this example, the inner peripheral surfaces of second fitting holes 23). The machining accuracy includes accuracy in the relative positional relationship between the first and second contact surfaces.

It is effective to improve the axis accuracy of the pinion shafts PS by first coupling the carrier coupling portion 10 and the carrier CA and fixing the relative positional relationship between the carrier coupling portion 10 and the carrier CA and then machining the first contact surfaces and the second contact surfaces and adjusting the relative positional relationship between the first and second contact surfaces. However, if the machining the first contact surfaces and the second contact surfaces is performed with the pinion gears P being placed in placement spaces 18 for the pinion gears P which are formed between the first and second shaft support portions 11, 21, the pinion gears P may hinder the machining or may be damaged during the machining. It is therefore desirable to insert the pinion gears P into the placement spaces 18 between the first and second shaft support portions 11, 21 after coupling the carrier coupling portion 10 and the carrier CA and machining the carrier coupling portion 10 and the carrier CA. The carrier CA and the carrier coupling portion 10 are therefore formed so that the pinion gears P can be inserted between the first and second shaft support portions 11, 21 in the axial direction X from the outside in the radial direction R. Accordingly, passage spaces for the pinion gears P to pass therethrough are formed so that the pinion gears P can be inserted through the passage spaces into the placement spaces 18 between the first and second shaft support portions 11, 21 after the carrier coupling portion 10 and the carrier CA are coupled.

In the present embodiment, the coupling inner portion 12, namely a part of the carrier coupling portion 10 which is located on the radially inner side R2 with respect to the pinion gears P, is located between the first sun gear S1 and the second sun gear S2 in the axial direction X. Accordingly, the coupling inner portion 12 of the carrier coupling portion 10 is located on the radially inner side R2 with respect to the placement spaces 18 for the pinion gears P which are formed between the first and second shaft support portions 11, 21, and the pinion gears P cannot be inserted into the placement spaces 18 from the radially inner side R2.

The carrier coupling portion 10 and the carrier CA are therefore formed so as not to overlap the pinion gears P as viewed in the radial direction R in a range A in the radial direction R of the carrier coupling portion 10 from the end on the radially outer side R1 of each pinion gear P to the position located away from this end toward the radially outer side R1 by at least the distance equal to the diameter of the pinion gear P.

According to this configuration, after the carrier coupling portion 10 and the carrier CA are coupled, the pinion gears P can be placed in the regions of the range A which are located on the radially outer side R1 with respect to the placement spaces 18. The pinion gears P can thus be slid from the regions of the range A toward the radially inner side R2 and inserted into the placement spaces 18 for the pinion gears P. That is, this configuration secures the passage spaces for the pinion gears P to pass therethrough when the pinion gears P are inserted into the placement spaces 18. In the present embodiment, as described above, the chain CH is disposed so as to extend toward the radially outer side R1 with respect to the output gear GO. A spatial allowance in the direction in which the chain CH extends can therefore be easily secured on the radially outer side R1 with respect to the carrier CA and the carrier coupling portion 10. The configuration that allows the pinion gears P to be inserted from the radially outer side R1 into the placement spaces 18 for the pinion gears P which are formed between the first and second shaft support portions 11, 21 can therefore be easily implemented by using such a space located on the radially outer side R1 with respect to the carrier CA and the carrier coupling portion 10.

In the present embodiment, each pinion gear P is formed in a cylindrical shape. The pinion gear P has a through hole 35 extending through its central portion in the axial direction X and has a gear tooth surface on its outer peripheral surface. The pinion shaft PS is inserted through the through hole 35 of the pinion gear P and supports the pinion gear P from inside in the radial direction so that the pinion gear is rotatable. The through hole 35 of the pinion gear P is formed in a columnar shape, and the pinion shaft PS is formed in a columnar shape. A bearing 36, 37 is disposed between the inner peripheral surface of the through hole 35 of the pinion gear P and the outer peripheral surface of the pinion shaft PS. In this example, the bearing is formed by a plurality of columnar rollers 37 arranged in the circumferential direction C and extending in the axial direction X and a cylindrical gauge 36 holding the plurality of rollers 37.

The first shaft support portions 11 are parts of the carrier coupling portion 10 which are located on the first side X1 in the axial direction with respect to the pinion gears P. The plurality of (in this example, three) first shaft support portions 11 are formed so as to correspond to the plurality of pinion gears P. The first shaft support portions 11 are formed in the shape of a plate extending in the radial direction R and the circumferential direction C. Each of the first shaft support portions 11 has the first fitting hole 16 formed in a columnar shape so as to extend therethrough in the axial direction X. The end on the first side X1 in the axial direction of the pinion shaft PS is fitted in the first fitting hole 16. The inside diameter of the first fitting hole 16 is increased in a stepped manner such that a part of the first fitting hole 16 which is located on the second side X2 in the axial direction is larger than a part of the first fitting hole 16 which is located on the first side X1 in the axial direction. The first fitting hole 16 thus has a stepped surface facing the second side X2 in the axial direction. The pinion shaft PS is fitted in the part of the first fitting hole 16 which is located on the second side X2 in the axial direction, and the end face on the first side X1 in the axial direction of the pinion shaft PS contacts the stepped surface of the first fitting hole 16.

The carrier coupling portion 10 includes the coupling outer portion 14 that is a portion located on the radially outer side R1 with respect to the pinion gears P. The coupling outer portion 14 has outwardly extended portions 19 that are portions extended from the first shaft support portions 11 toward the radially outer side R1. Each of the outwardly extended portions 19 extends from the first shaft support portion 11 toward the radially outer side R1 to the position located away from the end on the radially outer side R1 of the pinion gear P toward the radially outer side R1 by at least the distance equal to the diameter of the pinion gear P. The outwardly extended portions 19 are located on the first side X1 in the axial direction with respect to the pinion gears P, and do not overlap the pinion gears P as viewed in the radial direction R. Accordingly, the outwardly extended portions 19 (coupling outer portion 14) do not overlap the pinion gears P in the range A from the end on the radially outer side R1 of each pinion gear P to the position located away from this end toward the radially outer side R1 by at least the distance equal to the diameter of the pinion gear P.

The second shaft support portions 21 are parts of the carrier CA which are located on the second side X2 in the axial direction with respect to the pinion gears P. The plurality of (in this example, three) second shaft support portions 21 are formed so as to correspond to the plurality of pinion gears P. The second shaft support portions 21 are formed in the shape of a plate extending in the radial direction R and the circumferential direction C. The width in the radial direction R of each of the second shaft support portions 21 is smaller than the diameter of the pinion gear P. The end on the radially outer side R1 of each pinion gear P projects from the second shaft support portion 21 toward the radially outer side R1 and the end on the radially inner side R2 of each pinion gear P projects from the second shaft support portion 21 toward the radially inner side R2, as viewed in the axial direction X.

Each of the second shaft support portions 21 has the second fitting hole 23 formed in a columnar shape so as to extend therethrough in the axial direction X. The end on the second side X2 in the axial direction of the pinion shaft PS is fitted in the second fitting hole 23. Each of the second shaft support portions 21 has a cylindrical clinch portion 25 projecting toward the second side X2 in the axial direction, and the clinch portion 25 also forms the second fitting hole 23.

Figure 8:
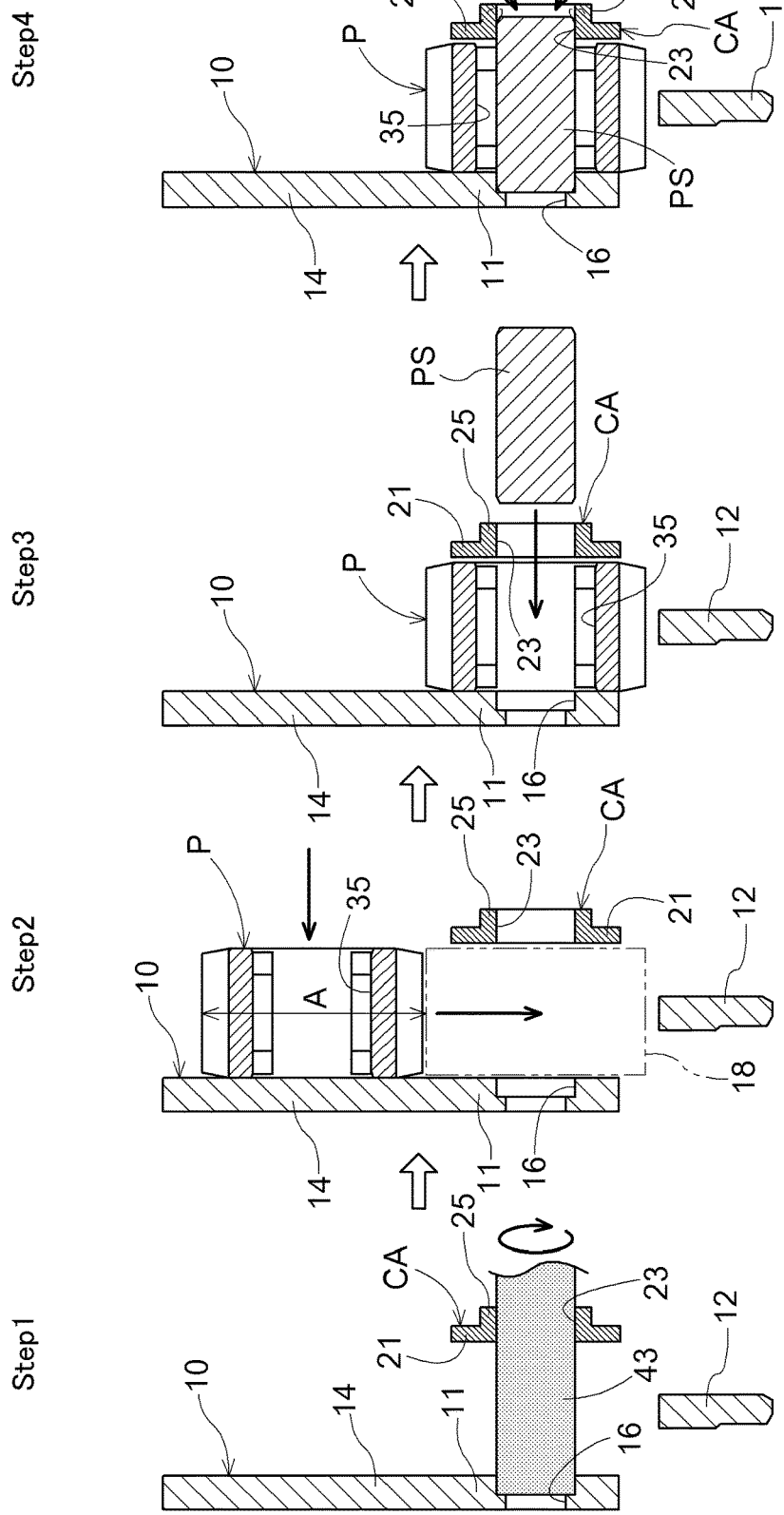
FIG. 8 is a sectional view illustrating an assembly procedure of the planetary gear mechanism according to the first embodiment.

In the present embodiment, as shown in Step1 of FIG. 8, after the carrier coupling portion 10 and the carrier CA are coupled together, the inner peripheral surfaces of the first and second fitting holes 16, 23 are cut with a drill 43 etc. by a single machining process, and the relative positional relationship between the first and second fitting holes 16, 23 is adjusted so that the first fitting hole 16 and the second fitting hole 23 are coaxial with each other, thereby improving the axis accuracy of the pinion shaft PS.

Thereafter, as shown in Step2 of FIG. 8, the pinion gear P is placed from the second side X2 in the axial direction or the radially outer side R1 into the region of the range A provided on the radially outer side R1 with respect to the placement space 18 for the pinion gear P. As shown in Step3 of FIG. 8, the pinion gear P is then slid from the region of the range A toward the radially inner side R2 and is inserted into the placement space 18 for the pinion gear P. The space through which the pinion gear P passes when inserted into the placement space 18 is the passage space. The pinion shaft PS is then inserted from the second side X2 in the axial direction into the second fitting hole 23, the through hole 35 for the pinion shaft PS, and the first fitting hole 16. Subsequently, as shown in Step4 of FIG. 8, the clinch portion 25 is clinched toward the inside of the second fitting hole 23. The clinch portion 25 thus contacts the end face on the second side X2 in the axial direction of the pinion shaft PS, so that the pinion shaft PS is retained so as not to come off from the second side X2 in the axial direction.

Figure 2:
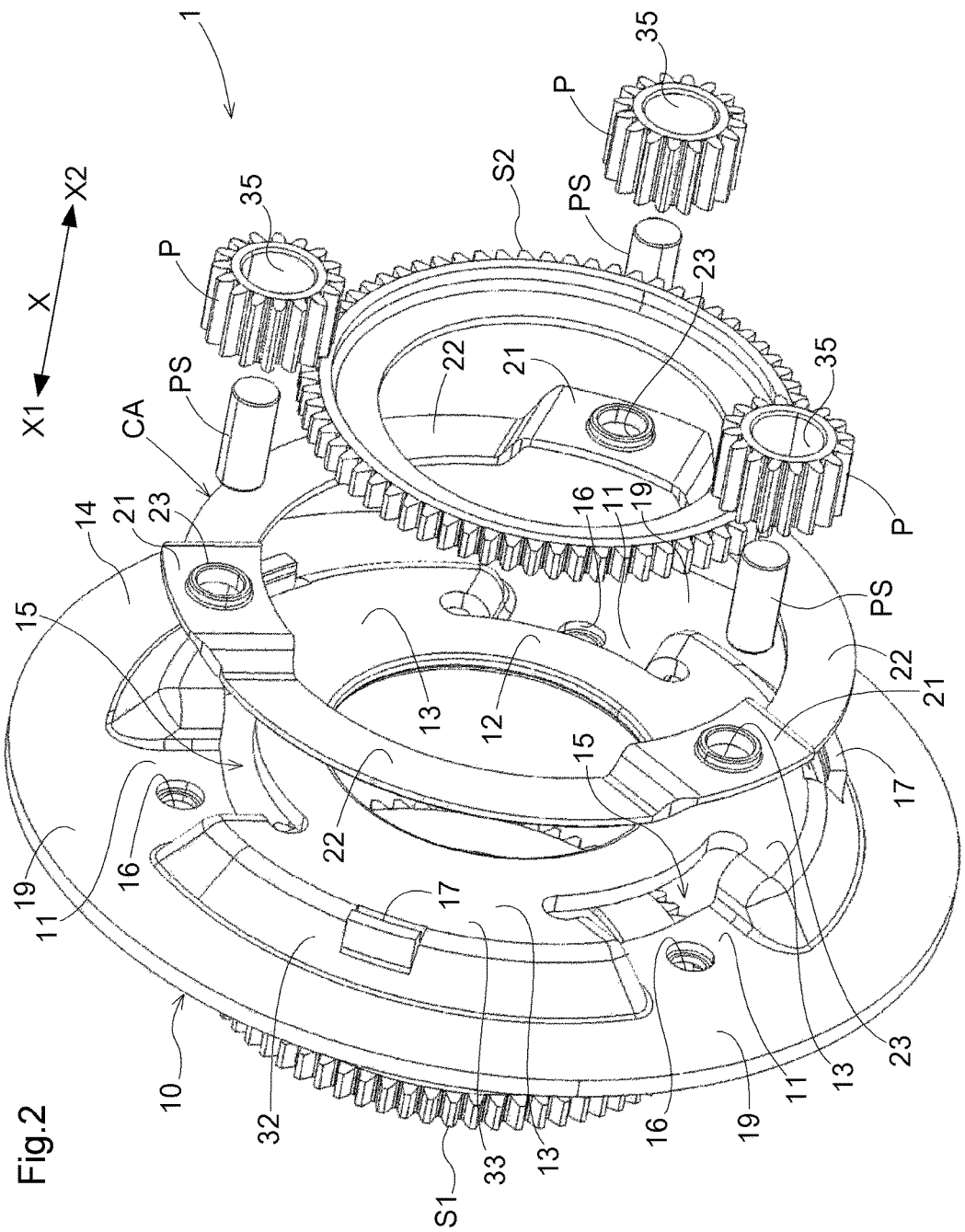
FIG. 2 is an exploded perspective view of the planetary gear mechanism according to the first embodiment as viewed from a second side in the axial direction.
Figure 3:
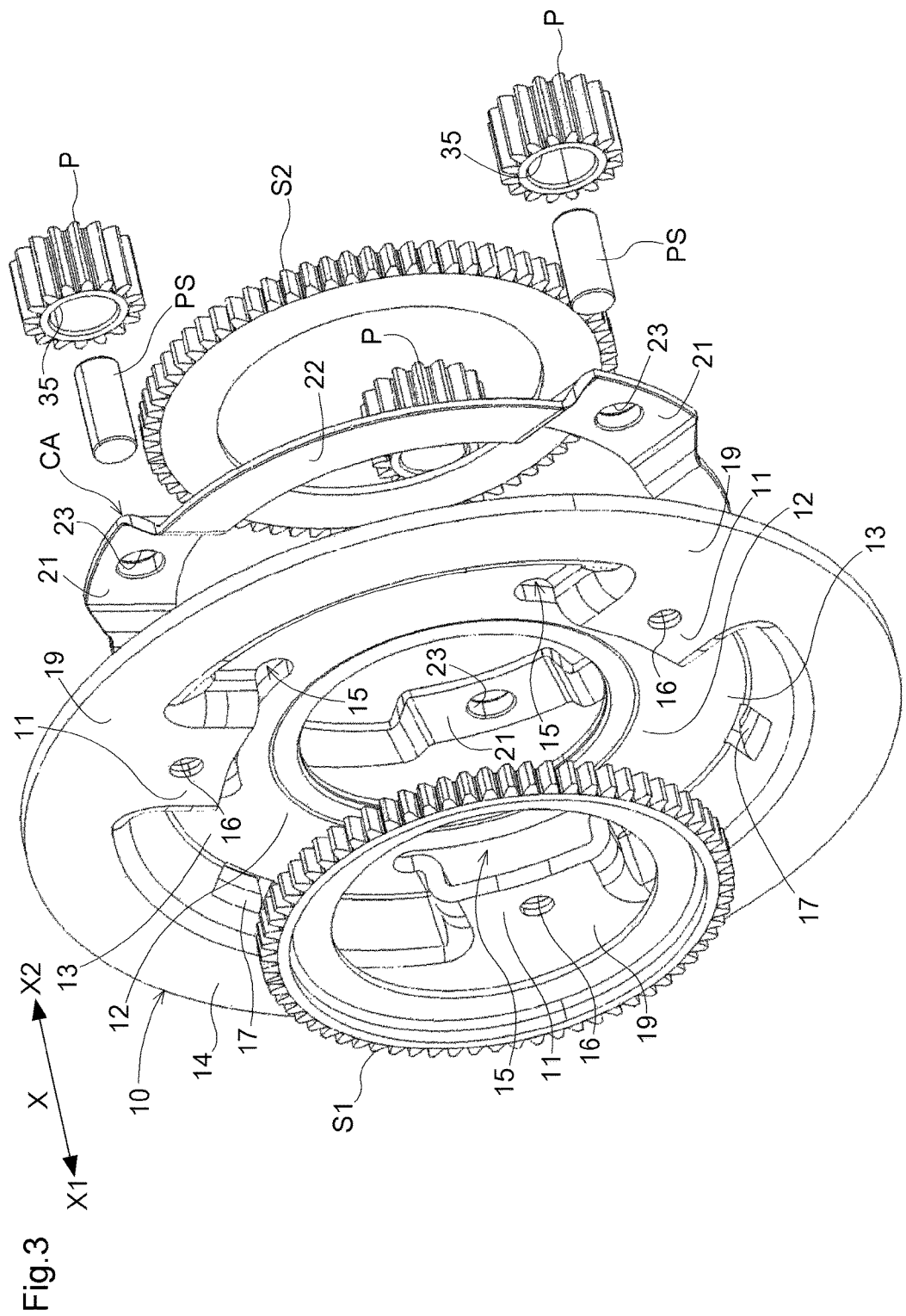
FIG. 3 is an exploded perspective view of the planetary gear mechanism according to the first embodiment as viewed from a first side in the axial direction.
Figure 4:
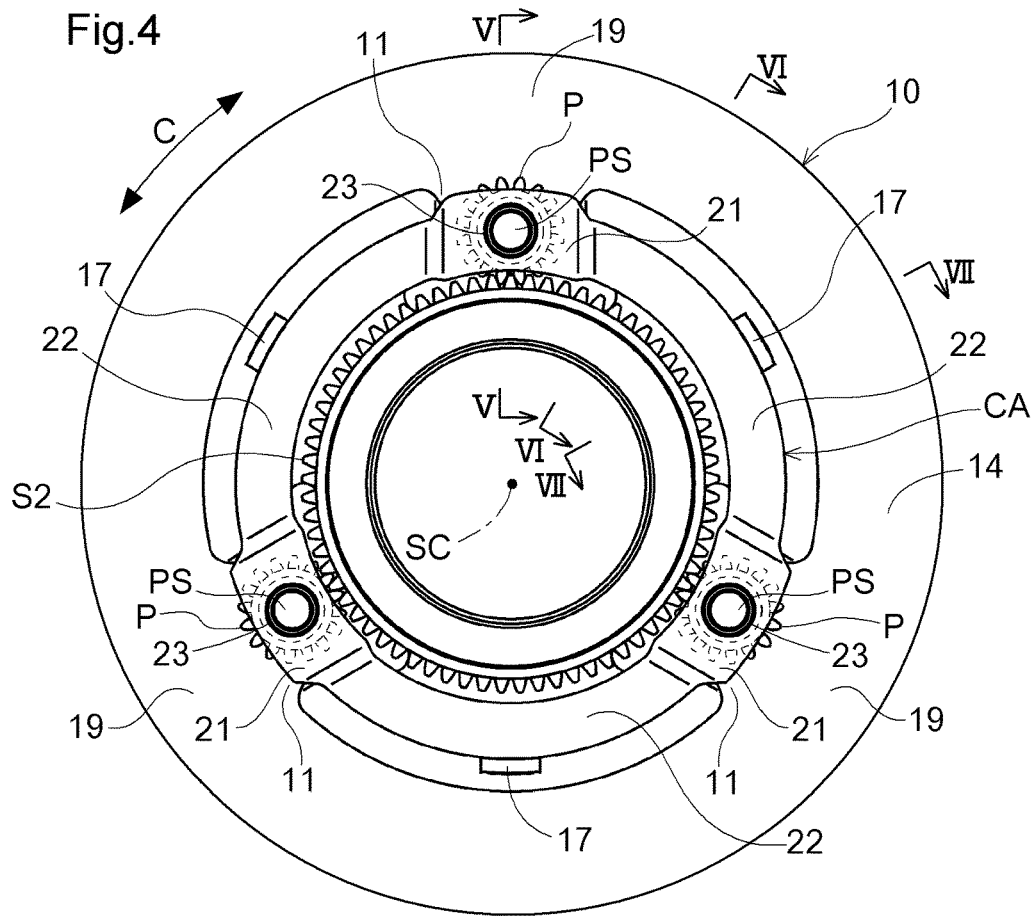
FIG. 4 is a plan view of the planetary gear mechanism according to the first embodiment as viewed from the second side in the axial direction.

As shown in FIGS. 2 to 4, in the present embodiment, the coupling outer portion 14, namely a part of the carrier coupling portion 10 which is located on the radially outer side R1 with respect to the pinion gears P, is formed in the shape of an annular disc and extends in the circumferential direction C and the radial direction R. A plurality of portions in the circumferential direction C of the annular disc-shaped coupling outer portion 14 serve as the outwardly extended portions 19 extending from the first shaft support portions 11 toward the radially outer side R1. The coupling outer portion 14 is located on the first side X1 in the axial direction with respect to the pinion gears P. In the present embodiment, the end on the radially outer side R1 of the coupling outer portion 14 is coupled to the driving force source side (in this example, the rotor support member 40) (see FIG. 1).

In the present embodiment, the carrier CA is formed in the shape of an annular disc and extends in the circumferential direction C and the radial direction R. The width in the radial direction R of the carrier CA is smaller than the diameter of the pinion gear P. A plurality of portions (in this example, three portions) in the circumferential direction C of the annular disc-shaped carrier CA serve as the second shaft support portions 21. The carrier CA includes carrier intermediate portions 22, each being a portion in the circumferential direction between the second shaft support portions 21 adjacent to each other in the circumferential direction. The carrier intermediate portions 22 are formed in the shape of an arc plate.

Figure 6:
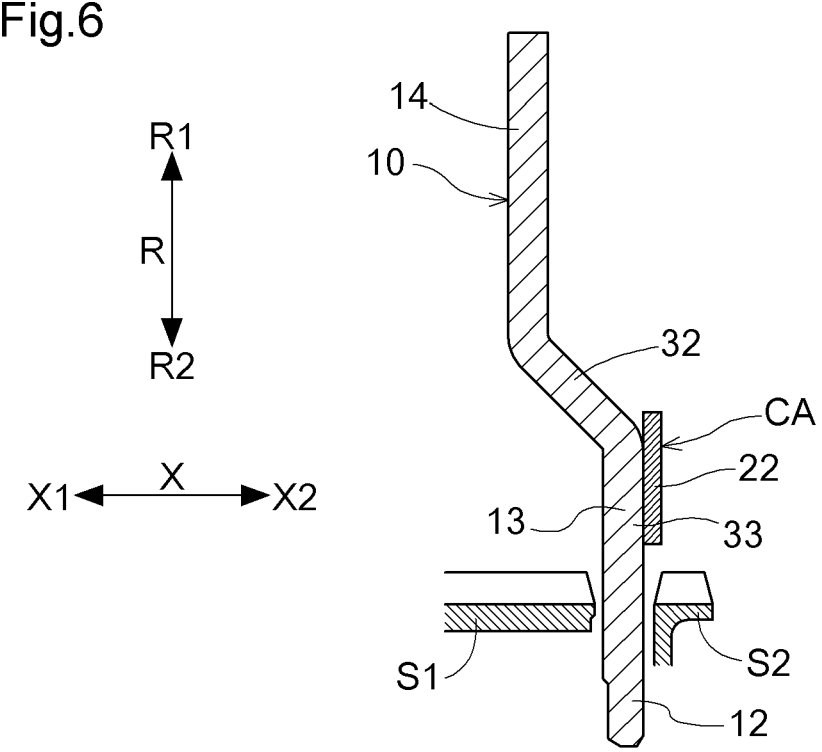
FIG. 6 is a sectional view of the planetary gear mechanism according to the first embodiment taken along a plane passing through the rotation axis of the carrier coupling portion but not passing through any pinion gear.

The same number of first shaft support portions 11 as the second shaft support portions 21 are formed at the positions in the circumferential direction C which correspond to the second shaft support portions 21. The carrier coupling portion 10 includes coupling intermediate portions 13, each being a portion in the circumferential direction C between the first shaft support portions 11 adjacent to each other in the circumferential direction C. As shown in FIG. 6 etc., the surface on the first side X1 in the axial direction of the carrier intermediate portion 22 is in contact with the surface on the second side X2 in the axial direction of the coupling intermediate portion 13. Since the carrier intermediate portions 22 contact the coupling intermediate portions 13, deformation such as torsion of the carrier CA is restrained and accuracy in supporting the pinion shaft PS is maintained.

The coupling inner portion 12, namely a part of the carrier coupling portion 10 which is located on the radially inner side R2 with respect to the pinion gears P, is formed in the shape of an annular disc and extends in the circumferential direction C and the radial direction R. As described above, the coupling inner portion 12 is located between the first sun gear S1 and the second sun gear S2 in the axial direction X. The coupling inner portion 12 is positioned in the axial direction X so as to overlap the central portions in the axial direction X of the pinion gears P. Since the coupling inner portion 12 is placed in this manner, the carrier coupling portion 10 can be extended toward the radially inner side R2 with respect to the pinion gears P, the first coupling member 41 can be extended from the first sun gear S1 toward the first side X1 in the axial direction and coupled to the output gear GO, and the second coupling member 42 can be extended from the second sun gear S2 toward the second side X2 in the axial direction and coupled to the first and second one-way clutches F1, F2. Each of the first sun gear S1 and the second sun gear S2 is formed in a cylindrical shape and has a gear tooth surface on its outer peripheral surface. Each of the first sun gear S1 and the second sun gear S2 has its part on the radially inner side R2 coupled to the first coupling member 41 or the second coupling member 42. In the present embodiment, the part of the coupling inner portion 12 which is located on the radially inner side R2 with respect to the first sun gear S1 and the second sun gear S2 is coupled to the wheel W side (in this example, the input shaft TI of the shift device TM).

As shown in FIGS. 5, 2, etc., the carrier coupling portion 10 has openings 15 each formed between the first shaft support portion 11 and the coupling inner portion 12, and the pinion gears P mesh with the first sun gear S1 via the openings 15. The meshing portions between the first sun gear S1 and the pinion gears P are located in the openings 15. Since the openings 15 are formed, the pinion gears P can mesh with the first sun gear S1 even in the configuration in which the first shaft support portions 11 are located on the first side X1 in the axial direction with respect to the pinion gears P and the coupling inner portion 12 is located between the first sun gear S1 and the second sun gear S2 in the axial direction X.

As shown in FIGS. 6, 2, etc., the coupling outer portion 14 and the coupling inner portion 12 of the carrier coupling portion 10 are coupled via the coupling intermediate portions 13. The driving force of the driving force source transmitted to the end on the radially outer side R1 of the coupling outer portion 14 is transmitted to the coupling inner portion 12 via the coupling outer portion 14 and the coupling intermediate portions 13 and is transmitted to the wheel W side.

The coupling intermediate portions 13 are formed to project from the coupling outer portion 14 and the first shaft support portions 11 toward the second side X2 in the axial direction so that the coupling intermediate portions 13 are positioned in the axial direction X so as to overlap the coupling inner portion 12. The coupling intermediate portions 13 are continuous with the coupling inner portion 12. Each of the coupling intermediate portions 13 has a projecting portion 32 projecting from the end on the radially inner side R2 of the coupling outer portion 14 toward the second side X2 in the axial direction and the radially inner side R2 and projecting from the ends in the axial direction X of the first shaft support portions 11 toward the second side X2 in the axial direction. The coupling intermediate portion 13 has a portion in the shape of an arc plate extending from the end on the second side X2 in the axial direction of the projecting portion 32 toward the radially inner side R2 and in the circumferential direction C. The surface on the second side X2 in the axial direction of this portion in the shape of an arc plate (hereinafter referred to as the plate-like portion 33) contacts the surface on the first side X1 in the axial direction of the carrier intermediate portion 22.

The plate-like portion 33 of the coupling intermediate portion 13 is a portion in the shape of a plate extended from the coupling inner portion 12 toward the radially outer side R1. The plate-like portion 33 of the coupling intermediate portion 13 is located at the same position in the axial direction X as the coupling inner portion 12. The surface on the second side X2 in the axial direction of the plate-like portion 33 is flush with the surface on the second side X2 in the axial direction of the coupling inner portion 12, and the surface on the first side X1 in the axial direction of the plate-like portion 33 is flush with the surface on the first side X1 in the axial direction of the coupling inner portion 12. There is thus no step between the plate-like portion 33 of the coupling intermediate portion 13 and the coupling inner portion 12, and the carrier coupling portion 10 has a step only in the projecting portion 32 in the range from the coupling outer portion 14 to the coupling inner portion 12. It is therefore easy to maintain strength of the member.

Figure 7:
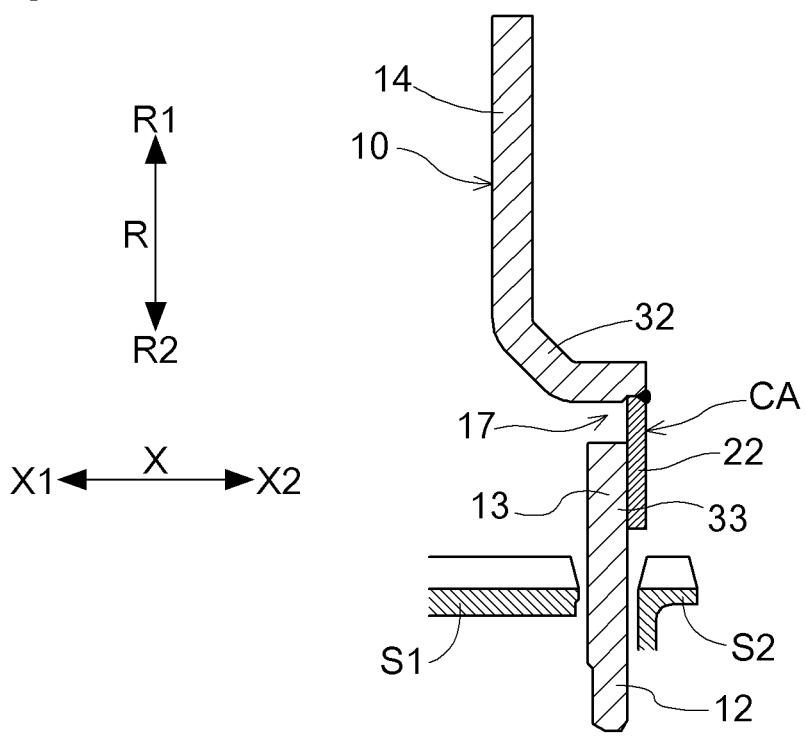
FIG. 7 is a sectional view of the planetary gear mechanism according to the first embodiment taken along a plane passing through the rotation axis of the carrier coupling portion and a weld between a carrier and the carrier coupling portion.

The carrier intermediate portions 22 are connected to the coupling intermediate portions 13 by welding. In the present embodiment, each of the coupling intermediate portions 13 has a weld 17 near the boundary between the projecting portion 32 and the plate-like portion 33. The weld 17 is located in the central portion in the circumferential direction C of the coupling intermediate portion 13. As shown in FIG. 7 etc., the weld 17 is formed so that the end on the second side X2 in the axial direction of the projecting portion 32 is partially disconnected from the plate-like portion 33 and is bent so as to project beyond the plate-like portion 33 toward the second side X2 in the axial direction. The surface on the radially outer side R1 of the carrier intermediate portion 22 is fitted on the surface on the radially inner side R2 of the weld 17, and these fitted surfaces are connected by welding (in this example, welded from the second side X2 in the axial direction).

As shown in FIGS. 2, 3, etc., the second shaft support portions 21 are formed to project from the carrier intermediate portions 22 toward the second side X2 in the axial direction so that the second shaft support portions 21 are located on the second side X2 in the axial direction with respect to the pinion gears P. As described above, the coupling intermediate portions 13 are formed to project from the coupling outer portion 14 and the first shaft support portions 11 toward the second side X2 in the axial direction. This restrains an increase in amount by which the second shaft support portions 21 project toward the second side X2 in the axial direction, and it is therefore easy to maintain strength of the carrier CA.

2. Second Embodiment

A second embodiment of the planetary gear mechanism 1 will be described below with reference to FIGS. 9 to 13. In the present embodiment, the positions in the axial direction X of the carrier CA and the carrier coupling portion 10 relative to other members are switched from the first embodiment. The planetary gear mechanism 1 of the present embodiment will be described below mainly with respect to the differences from the first embodiment. The present embodiment is similar to the first embodiment in respects that are not particularly described below.

Figure 9:
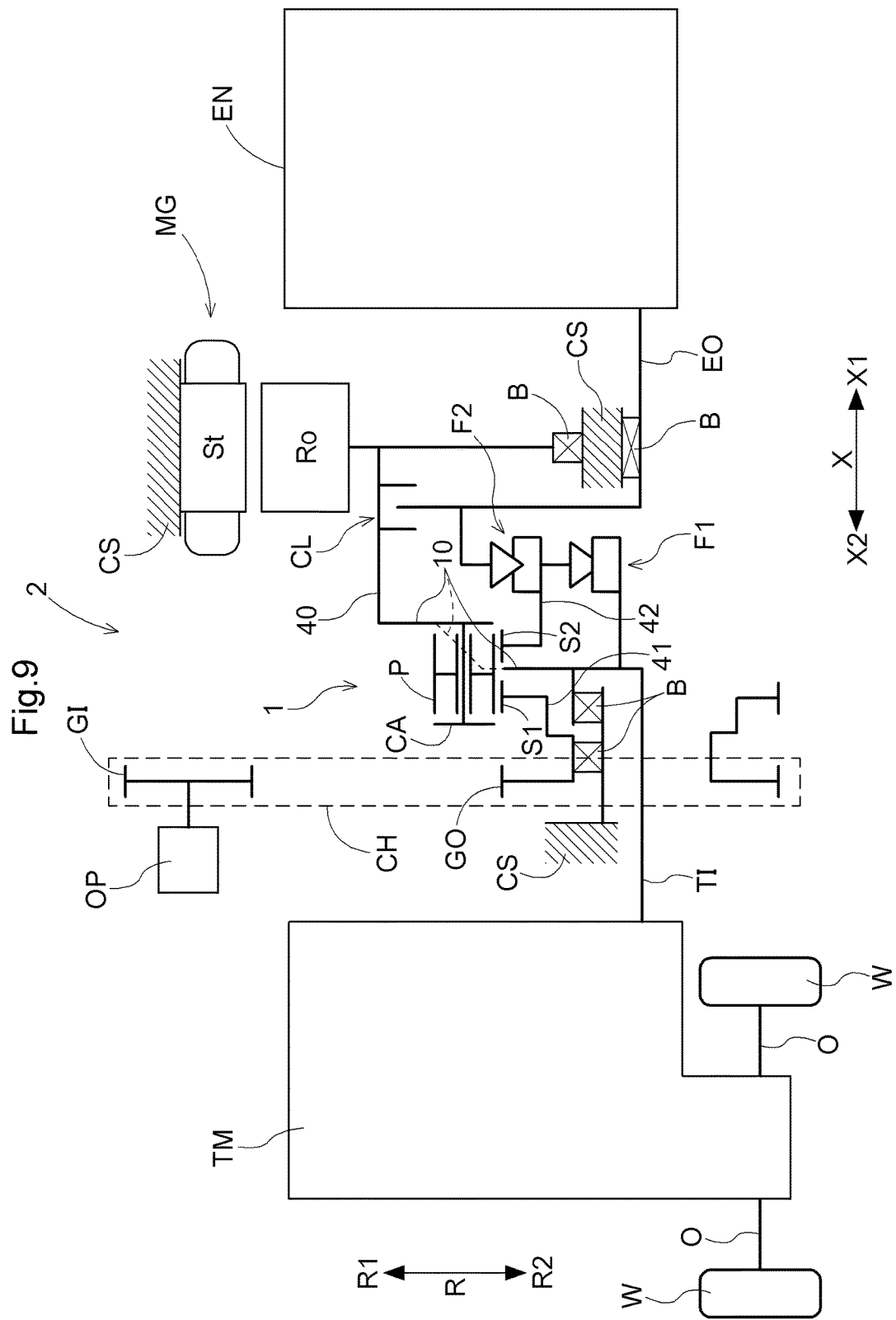
FIG. 9 is a skeleton drawing showing the general configuration of a vehicle drive device having a planetary gear mechanism according to a second embodiment incorporated therein.

As shown in FIG. 9, in the present embodiment, the carrier coupling portion 10 is disposed on the driving force source (the internal combustion engine EN and the rotating electrical machine MG) side in the axial direction X with respect to the carrier CA. In other words, the carrier coupling portion 10 is disposed on the second sun gear S2 side in the axial direction X with respect to the first sun gear S1, and the carrier CA is disposed on the first sun gear S1 side in the axial direction X with respect to the second sun gear S2. In the present embodiment, the relationship between the first side X1 in the axial direction and the second side X2 in the axial direction is therefore reversed from that in the first embodiment, so that the right side in FIG. 9, namely the side from the planetary gear mechanism 1 toward the driving force sources, is the first side X1 in the axial direction, and the left side in FIG. 9, namely the side from the planetary gear mechanism 1 toward the shift device TM, is the second side X2 in the axial direction.

Accordingly, in the present embodiment, the output gear GO is disposed on the second side X2 in the axial direction with respect to the first sun gear S1, namely on the opposite side in the axial direction X of the first sun gear S1 from the second sun gear S2. The chain CH is disposed adjacent to the carrier CA in the axial direction X. In the present embodiment, the chain CH is disposed adjacent to the carrier CA on the second side X2 in the axial direction.

In the present embodiment as well, the end on the radially outer side R1 of the carrier coupling portion 10 is coupled to the rotor support member 40 that supports the rotor Ro of the rotating electrical machine MG In the present embodiment, however, since the carrier coupling portion 10 is disposed on the driving force source side in the axial direction X with respect to the carrier CA, the rotor support member 40 is formed in a tubular shape extending toward the opposite side in the axial direction from the pinion gears P, namely toward the first side X1 in the axial direction.

Figure 10:
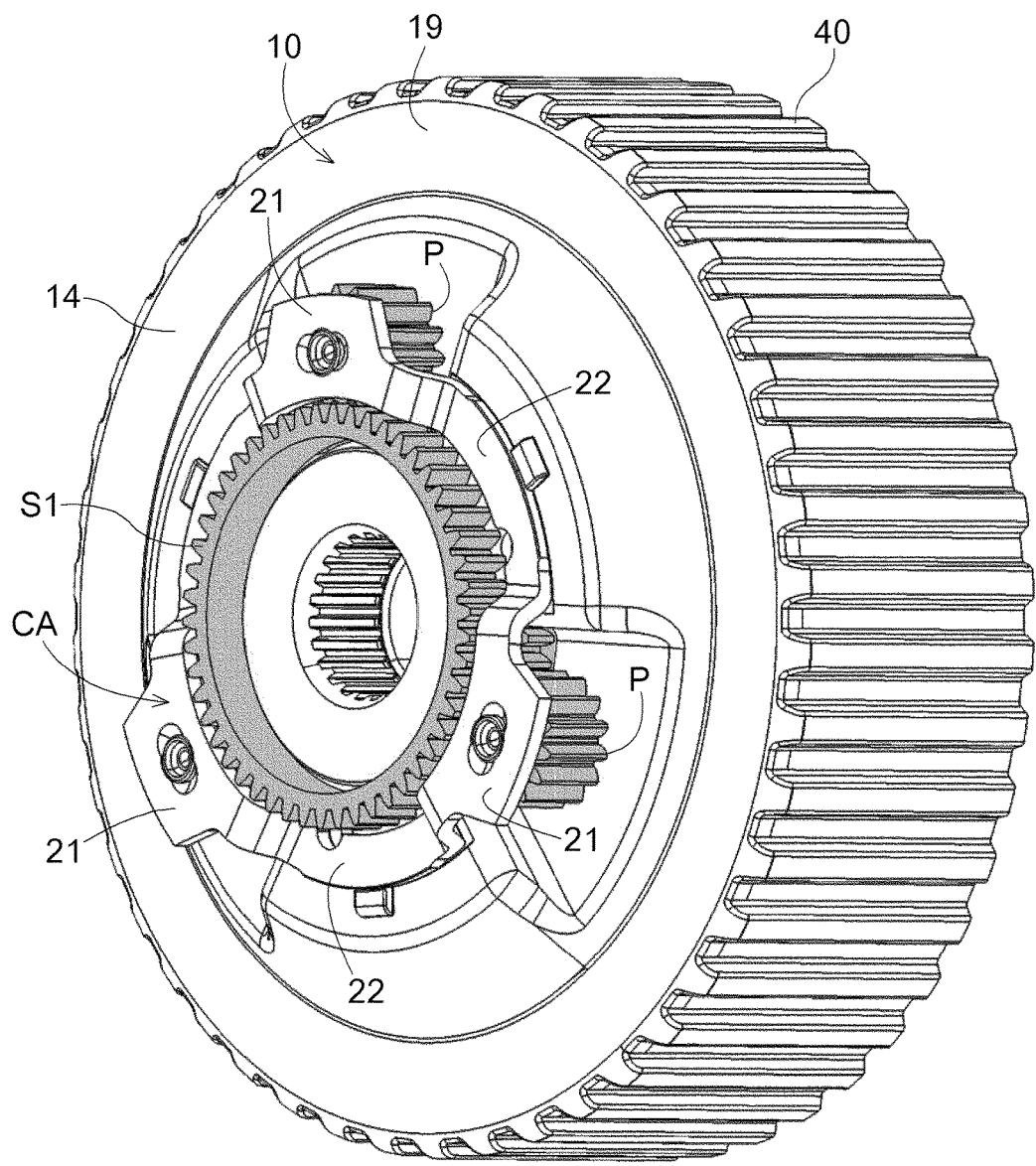
FIG. 10 is a perspective view of the planetary gear mechanism according to the second embodiment as viewed from the second side in the axial direction.

Accordingly, in the first embodiment, the rotor support member 40 is disposed on the radially outer side R1 with respect to the pinion gears P so as to overlap the pinion gears P as viewed in the radial direction R, as shown in FIG. 1. In the present embodiment, however, as shown in FIGS. 9, 10, etc., the rotor support member 40 does not overlap the pinion gears P as viewed in the radial direction R. The radially outer side R1 of each pinion gear P is therefore not covered by the rotor support member 40. In the present embodiment, the rotor support member 40 includes a clutch drum of the clutch CL, and in FIGS. 10 to 12, a splined cylindrical portion that functions as the clutch drum is shown as a part of the rotor support member 40.

Figure 11:
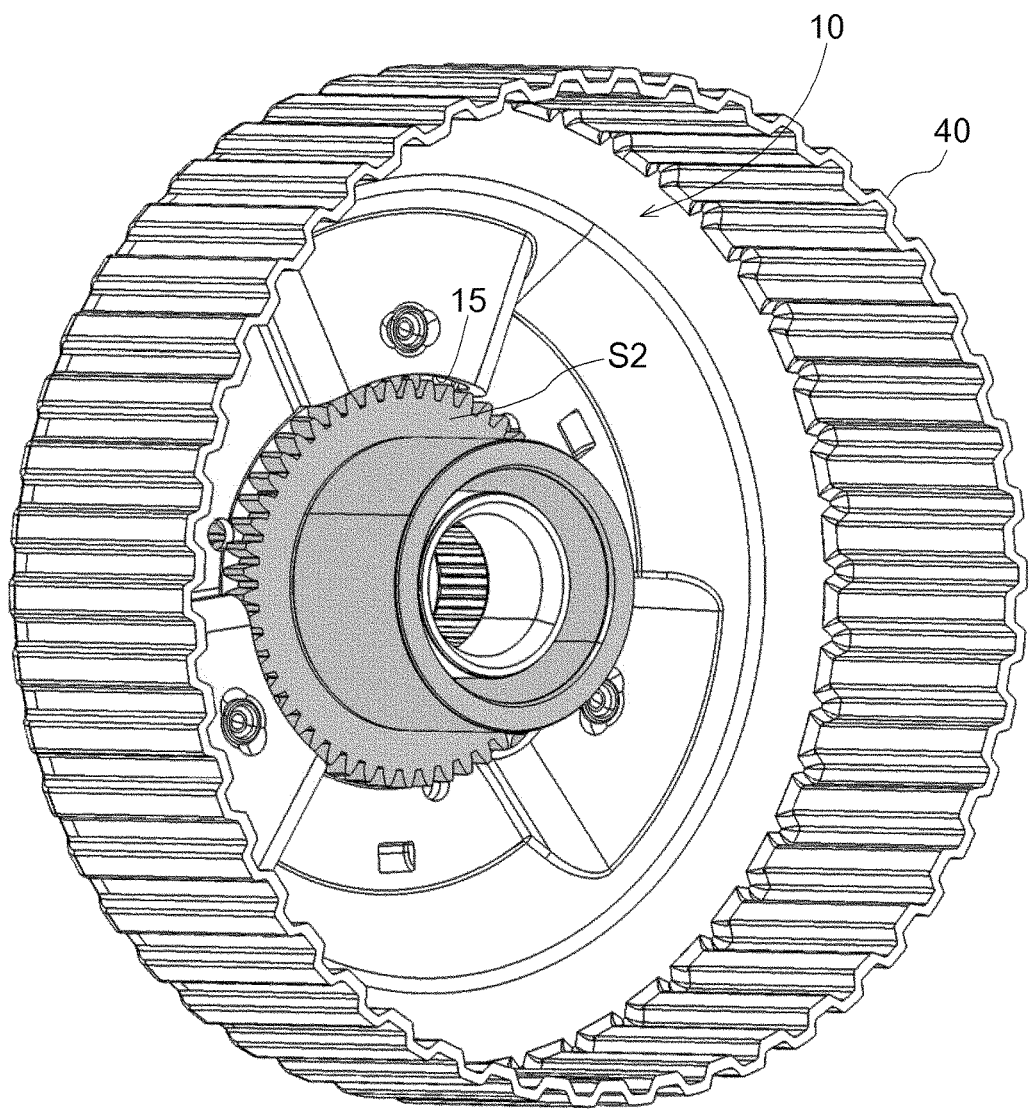
FIG. 11 is a perspective view of the planetary gear mechanism according to the second embodiment as viewed from the first side in the axial direction.
Figure 12:
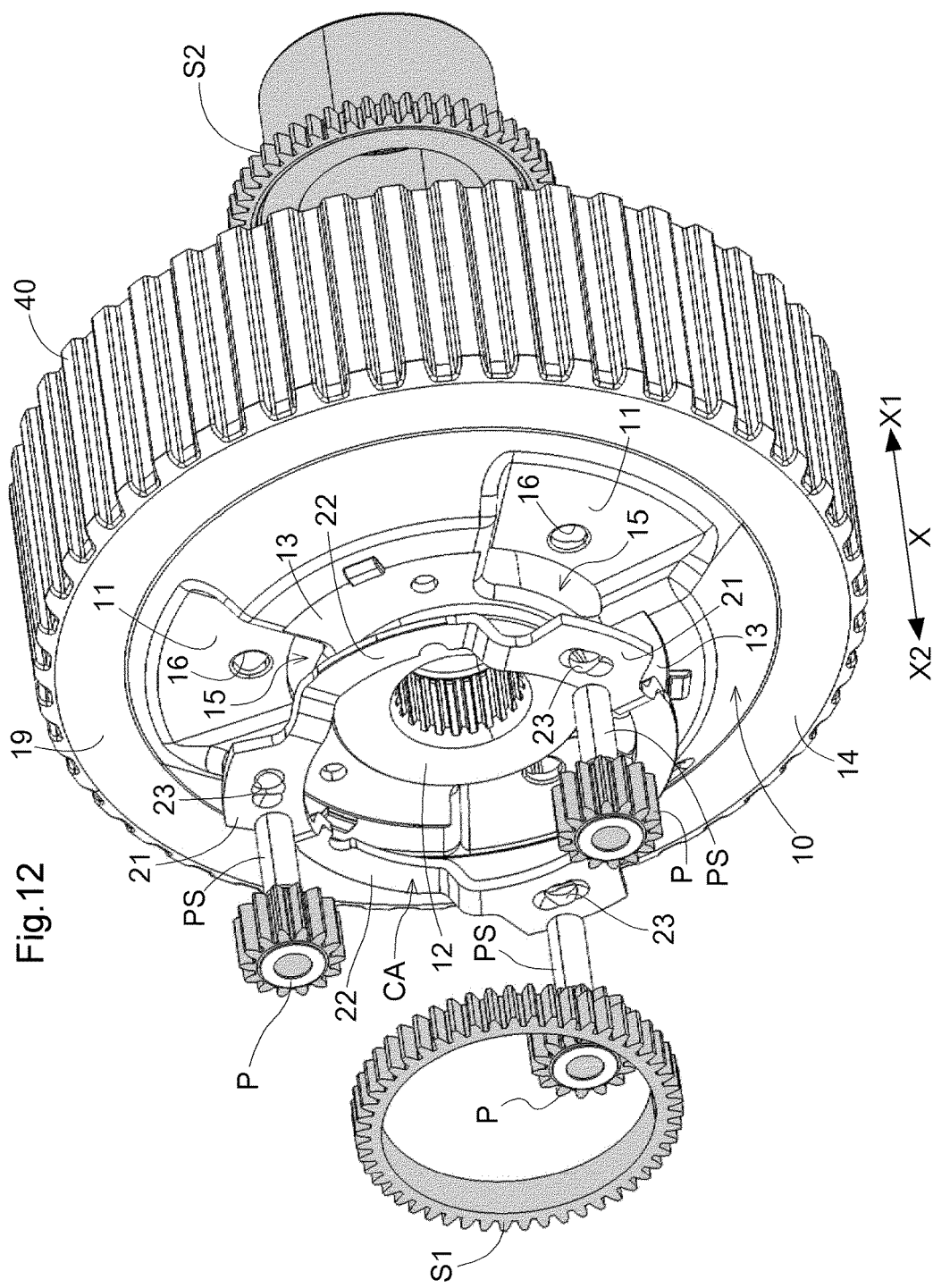
FIG. 12 is an exploded perspective view of the planetary gear mechanism according to the second embodiment as viewed from the second side in the axial direction.
Figure 13:
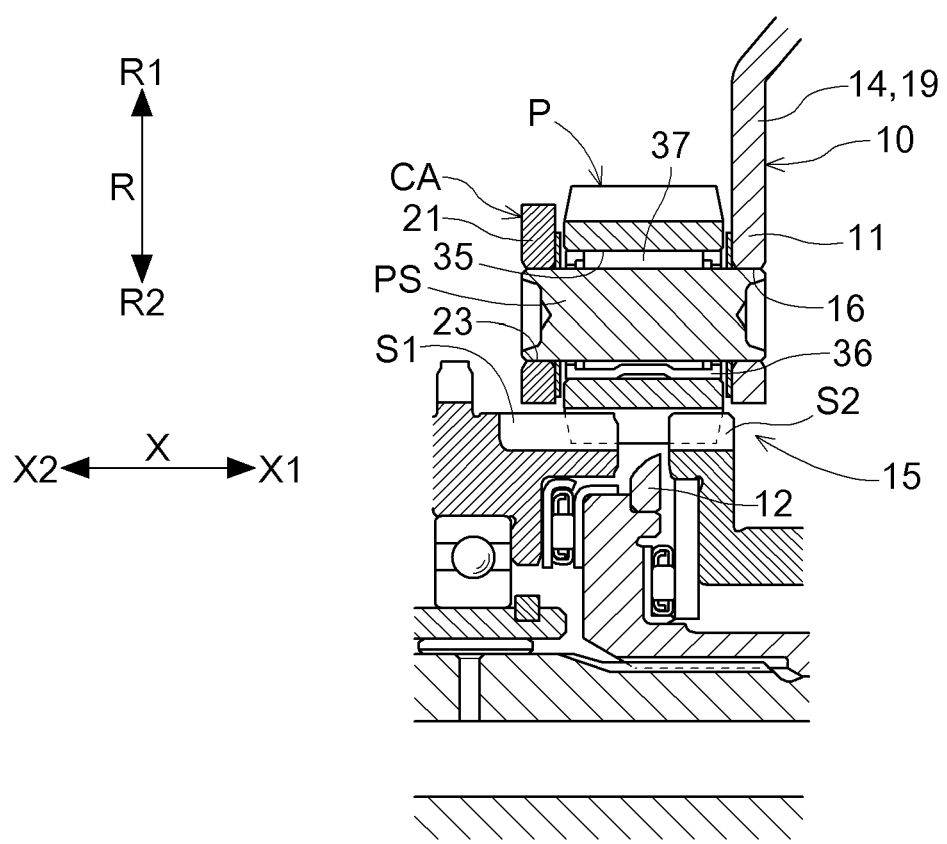
FIG. 13 is a sectional view of the planetary gear mechanism according to the second embodiment taken along a plane passing through the rotation axis of a carrier coupling portion and a pinion gear.

In the present embodiment, the positions of the carrier coupling portion 10 and the carrier CA in the axial direction X relative to the first sun gear S1 and the second sun gear S2 are switched from the first embodiment. As shown in FIGS. 11 and 13, the pinion gears P thus mesh with the second sun gear S2 via the openings 15 formed in the carrier coupling portion 10. That is, the meshing portions between the second sun gear S2 and the pinion gears P are located in the openings 15. In the present embodiment, as clearly shown in FIG. 12, the openings 15 have a different shape from those of the first embodiment and have a narrower opening width in the circumferential direction C than in the first embodiment.

In the present embodiment, the carrier CA also has a different shape from that of the first embodiment. In the present embodiment as well, the carrier CA is formed in the shape of an annular disc and extends in the circumferential direction C and the radial direction R. In the present embodiment, however, as shown in FIGS. 10 and 12, the second shaft support portions 21 are formed to project from the carrier intermediate portions 22 toward the radially outer side R1. That is, in the present embodiment, the carrier intermediate portions 22 have a smaller width in the radial direction R than the second shaft support portions 21. In the present embodiment as well, the width in the radial direction R of each of the second shaft support portions 21 is smaller than the diameter of the pinion gear P.

In the present embodiment as well, the carrier CA and the carrier coupling portion 10 are formed so that the pinion gears P can be inserted between the first and second shaft support portions 11, 21 in the axial direction X from the outside in the radial direction R. Accordingly, when the carrier coupling portion 10 and the carrier CA are coupled, passage spaces for the pinion gears P to pass therethrough are formed so that the pinion gears P can be inserted through the passage spaces into the placement spaces 18 between the first and second shaft support portions 11, 21.

In the present embodiment as well, each pinion gear P is formed in a cylindrical shape. As shown in FIG. 13, the pinion gear P has the through hole 35 extending through its central portion in the axial direction X. The pinion shaft PS is inserted through the through hole 35, and the pinion gear P is rotatably supported from inside in the radial direction via the bearing 36, 37. Each of the first shaft support portions 11 of the carrier coupling portion 10 has the first fitting hole 16 formed in a columnar shape so as to extend therethrough in the axial direction X. Each of the second shaft support portions 21 of the carrier CA has the second fitting hole 23 formed in a columnar shape so as to extend therethrough in the axial direction X. In the present embodiment, the first fitting hole 16 and the second fitting hole 23 are through holes having a uniform inside diameter in the axial direction X. The end on the first side X1 in the axial direction of the pinion shaft PS is fitted in the first fitting hole 16, and the end on the second side X2 in the axial direction of the pinion shaft PS is fitted in the second fitting hole 23.

3. Other Embodiments

Lastly, other embodiments of the planetary gear mechanism 1 will be described. The configuration of each embodiment described below may be used not only solely but also in combination with any of the configurations of the other embodiments unless inconsistency arises.

(1) The above embodiments are described with respect to the case where the vehicle drive device 2 has the planetary gear mechanism 1 incorporated therein. However, embodiments of the planetary gear mechanism 1 are not limited to these. That is, the planetary gear mechanism 1 may be incorporated in a power transmission device different from the vehicle drive device 2. Even when the planetary gear mechanism 1 is incorporated in the vehicle drive device 2, the planetary gear mechanism 1 may have a different configuration from the above embodiments, such as a configuration in which power is transmitted to a mechanism other than the oil pump OP.

(2) The above embodiments are described with respect to the case where the carrier CA is formed in the shape of an annular disc. However, embodiments of the planetary gear mechanism 1 are not limited to these. That is, the carrier CA may not have the shape of an annular disc and may have any shape as long as it has the second shaft support portions 21. For example, the carrier CA may have a triangular shape as viewed in the axial direction X.

(3) The above embodiments are described with respect to the case where the carrier coupling portion 10 and the carrier CA are fixed together by welding the carrier intermediate portions 22 and the coupling intermediate portions 13. However, embodiments of the planetary gear mechanism 1 are not limited to these. That is, the carrier coupling portion 10 and the carrier CA may be fixed together by a method other than welding, such as, e.g., clinching, bolting, or riveting.

4. Summary of the Embodiments

A summary of the planetary gear mechanism 1 described above will be provided below.

The planetary gear mechanism 1 is a planetary gear mechanism (1) including a first sun gear (S1) and a second sun gear (S2) which are arranged side by side in an axial direction (X), a plurality of pinion gears (P) that mesh with both the first sun gear (S1) and the second sun gear (S2), a carrier (CA) that supports the plurality of pinion gears (P), and a carrier coupling portion (10) that supports the plurality of pinion gears (P) and is coupled to the carrier (CA), wherein the carrier coupling portion (10) includes a first shaft support portion (11), a coupling outer portion (14) that is a portion located on an outer side (R1) in a radial direction (R) of the carrier (CA) with respect to the plurality of pinion gears (P), and a coupling inner portion (12) that is a portion located on an inner side (R2) in the radial direction (R) with respect to the plurality of pinion gears (P), each of the coupling outer portion (14) and the coupling inner portion (12) is coupled to other member, the carrier coupling portion (10) includes the first shaft support portion (11), the first shaft support portion (11) is located on a first side (X1) in the axial direction, which is one side in the axial direction (X), with respect to the pinion gears (P) and supports shafts (PS) of the plurality of pinion gears (P), the carrier (CA) includes a second shaft support portion (21), the second shaft support portion (21) is located on a second side (X2) in the axial direction, which is the other side in the axial direction (X), with respect to the pinion gears (P) and supports the shafts (PS) of the plurality of pinion gears (P), the coupling inner portion (12) is located between the first sun gear (S1) and the second sun gear (S2) in the axial direction (X), and the carrier (CA) and the carrier coupling portion (10) are formed so that the pinion gears (P) can be inserted between the first shaft support portion (11) and the second shaft support portion (21) in the axial direction (X) from outside in the radial direction (R).

The shafts (PS) of the pinion gears (P) are supported from both sides in the axial direction (X) by the first shaft support portion (11) of the carrier coupling portion (10) and the second shaft support portion (21) of the carrier (CA). In order to improve axis accuracy of the shafts (PS) of the pinion gears (P), it is necessary to increase machining accuracy, including the relative positional relationship, of the first shaft support portion (11) and the second shaft support portion (21). In order to increase the machining accuracy, it is desirable to machine the first shaft support portion (11) and the second shaft support portion (21) after coupling the carrier coupling portion (10) and the carrier (CA).

With the above configuration, the pinion gears can be inserted from the radially outer side (R1) into a placement space (18) for the pinion gears (P) which is formed between the first shaft support portion (11) and the second shaft support portion (21).

Accordingly, the first shaft support portion (11) and the second shaft support portion (21) can be machined by a single machining process after the carrier coupling portion (10) and the carrier (CA) are coupled together, whereby high axis accuracy of the pinion gears (P) can be ensured.

With the above characteristic configuration, the coupling inner portion (12) of the carrier coupling portion (10) is located between the first sun gear (S1) and the second sun gear (S2) in the axial direction (X). Accordingly, the carrier coupling portion (10) can be extended toward the radially inner side (R2) with respect to the pinion gears (P). Moreover, the first sun gear (S1) can be coupled to other member disposed on the one side in the axial direction (X) with respect to the first sun gear (S1), and the second sun gear (S2) can be coupled to other member disposed on the other side in the axial direction (X) with respect to the second sun gear (S2).

It is preferable that the carrier coupling portion (10) and the carrier (CA) be formed so as not to overlap the pinion gears (P) as viewed in the radial direction (R) in a range (A) in the radial direction (R) from an end on the outer side in the radial direction (R) of the pinion gear (P) to a position located away from this end toward the outer side (R1) in the radial direction (R) by at least a distance equal to a diameter of the pinion gear (P).

With this configuration, the pinion gears (P) can be first placed in a region of the range (A) provided on the outer side (R1) in the radial direction with respect to the placement space (18) for the pinion gears (P). The pinion gears (P) can then be slid from the region of the range (A) toward the radially inner side (R2) and inserted into the placement space (18). Accordingly, the first shaft support portion (11) and the second shaft support portion (21) can be machined by a single machining process after the carrier coupling portion (10) and the carrier (CA) are coupled together, whereby high axis accuracy of the pinion gears (P) can be ensured.

It is preferable that the carrier (CA) be formed in a shape of an annular disc, the second shaft support portion (21) be formed at a plurality of positions in a circumferential direction in the annular disc-shaped carrier (CA), the carrier (CA) include a carrier intermediate portion (22) that is a portion in the circumferential direction between the second shaft support portions (21) adjacent to each other in the circumferential direction, the same number of first shaft support portions (11) as the second shaft support portions (21) are formed at positions in the circumferential direction which correspond to the second shaft support portions (21), the carrier coupling portion (10) include a coupling intermediate portion (13) that is a portion in the circumferential direction (C) between the first shaft support portions (11) adjacent to each other in the circumferential direction, and a surface on the first side (X1) in the axial direction of the carrier intermediate portion (22) be in contact with a surface on the second side (X2) in the axial direction of the coupling intermediate portion (13).

With this configuration, since the carrier intermediate portion (22) contacts the coupling intermediate portion (13), deformation such as torsion of the carrier (CA) is restrained and accuracy in supporting the shafts (PS) of the pinion gears (P) is maintained.

It is preferable that the carrier intermediate portion (22) and the coupling intermediate portion (13) be connected by welding.

With this configuration, since the carrier intermediate portion (22) and the coupling intermediate portion (13) are connected by welding with the carrier intermediate portion (22) being in contact with the coupling intermediate portion (13), the carrier intermediate portion (22) and the coupling intermediate portion (13) can be connected satisfactorily without providing a fastening portion such as bolting. Since the positional relationship between the first shaft support portion (11) and the second shaft support portion (21) does not change once the carrier intermediate portion (22) and the coupling intermediate portion (13) are connected by welding, the first shaft support portions (11) and the second shaft support portions (21) can be machined by a single machining process, and high axis accuracy can be implemented. Moreover, since the positional relationship does not change after connection, high axis accuracy can be maintained.

It is preferable that the coupling outer portion (14) and the first shaft support portions (11) be located on the first side (X1) in the axial direction with respect to the pinion gears (P), and the coupling intermediate portion (13) be formed to project from the coupling outer portion (14) and the first shaft support portions (11) toward the second side (X2) in the axial direction so that the coupling intermediate portion (13) is positioned in the axial direction (X) so as to overlap the coupling inner portion (12), and the coupling intermediate portion (13) be continuous with the coupling inner portion (12).

With this configuration, the coupling outer portion (14) and the coupling inner portion (12) are connected by the coupling intermediate portion (13), so that a driving force can be transmitted between the coupling outer portion (14) and the coupling inner portion (12). Since the coupling intermediate portion (13) projects from the coupling outer portion (14) and the first shaft support portions (11) toward the second side (X2) in the axial direction, the coupling outer portion (14) and the first shaft support portions (11) which are located on the first side (X1) in the axial direction with respect to the pinion gears (P) can be connected to the coupling inner portion (12) that is located between the first sun gear (S1) and the second sun gear (S2) in the axial direction (X). Since the coupling intermediate portion (13) projects so that it is positioned in the axial direction (X) so as to overlap the coupling inner portion (12), the step between the coupling intermediate portion (13) and the coupling inner portion (12) is reduced, and strength of the connection portion therebetween can be easily maintained.

It is preferable that the second shaft support portions (21) be formed to project from the carrier intermediate portion (22) toward the second side (X2) in the axial direction so that the second shaft support portions (21) are located on the second side (X2) in the axial direction with respect to the pinion gears (P).

With this configuration, the second shaft support portions (21) are formed so as to project from the carrier intermediate portion (22) toward the second side (X2) in the axial direction. The second shaft support portions (21) can therefore be easily located on the second side (X2) in the axial direction with respect to the pinion gears (P).

It is preferable that the carrier coupling portion (10) have an opening (15) formed between the first shaft support portion (11) and the coupling inner portion (12), and the pinion gears (P) each mesh with the first sun gear (S1) or the second sun gear (S2) via the opening (15).

With this configuration, since the opening (15) is formed, the pinion gears (P) can mesh with the first sun gear (S1) or the second sun gear (S2) even in the configuration in which the first shaft support portion (11) is located on the first side (X1) in the axial direction with respect to the pinion gears (P) and the coupling inner portion (12) is located between the first sun gear (S1) and the second sun gear (S2) in the axial direction (X).

It is preferable that the planetary gear mechanism (1) further include: an output gear (GO); a drive gear (GI) disposed on the outer side (R1) in the radial direction (R) with respect to the output gear (GO) and coupled to an oil pump (OP); and a chain (CH) looped around the output gear (GO) and the drive gear (GI), the output gear (GO) be disposed on an opposite side in the axial direction (X) of the first sun gear (S1) from the second sun gear (S2), and be coupled to the first sun gear (S1), and the chain (CH) be disposed adjacent to the carrier (CA) or the carrier coupling portion (10) in the axial direction (X).

The chain (CH) is disposed so as to extend toward the outer side (R1) in the radial direction (R) with respect to the output gear (GO). A spatial allowance in the direction in which the chain (CH) extends can therefore be easily secured on the outer side (R1) in the radial direction (R) with respect to the carrier (CA) and the carrier coupling portion (10). The configuration that allows the pinion gears (P) to be inserted from the outside in the radial direction (R) into the placement space (18) for the pinion gears (P) which is formed between the first shaft support portion (11) and the second shaft support portion (21) can therefore be easily implemented by using such a space located on the outer side (R1) in the radial direction (R) with respect to the carrier (CA) and the carrier coupling portion (10).

It is preferable that only the first sun gear (S1) and the second sun gear (S2) mesh with the pinion gears (P), and a driving force transmitted to the second sun gear (S2) be transmitted from the second sun gear (S2) to the pinion gears (P), the first sun gear (S1), the output gear (GO), the chain (CH), and the oil pump (OP) in this order.

With this configuration, the driving force transmitted to the second sun gear (S2) can be appropriately transmitted to the oil pump (OP).

INDUSTRIAL APPLICABILITY

The technique according to the present disclosure is suitably used for planetary gear mechanisms including: a first sun gear and a second sun gear which are arranged side by side in an axial direction; a plurality of pinion gears that mesh with both the first sun gear and the second sun gear; and a carrier that supports the plurality of pinion gears.

DESCRIPTION OF THE REFERENCE NUMERALS

1: Planetary Gear Mechanism
2: Vehicle Drive Device
10: Carrier Coupling Portion
11: First Shaft Support Portion
12: Coupling Inner Portion
13: Coupling Intermediate Portion
14: Coupling Outer Portion
15: Opening
17: Weld
21: Second Shaft Support Portion
22: Carrier Intermediate Portion
C: Circumferential Direction
CA: Carrier
F1: First One-Way Clutch
F2: Second One-Way Clutch
OP: Oil Pump
P: Pinion Gear
PS: Shaft of Pinion Gear (Pinion Shaft)
R: Radial Direction
R2: Radially Inner Side
R1: Radially Outer Side
S1: First Sun Gear
S2: Second Sun Gear
SC: Rotation Axis
X: Axial Direction
X1: First Side in Axial Direction
X2: Second Side in Axial Direction

The invention claimed is:
1. A planetary gear mechanism comprising
a first sun gear and a second sun gear which are arranged side by side in an axial direction,
a plurality of pinion gears that mesh with both the first sun gear and the second sun gear,
a carrier that supports the plurality of pinion gears,
a carrier coupling portion that supports the plurality of pinion gears and is coupled to the carrier;
an output gear,
a drive gear disposed on the outer side in the radial direction of the output gear and coupled to an oil pump, and
a chain looped around the output gear and the drive gear, wherein
the carrier coupling portion includes a first shaft support portion, a coupling outer portion that is a portion located on an outer side in a radial direction of the carrier with respect to the plurality of pinion gears, and a coupling inner portion that is a portion located on an inner side in the radial direction with respect to the plurality of pinion gears,
each of the coupling outer portion and the coupling inner portion is coupled to other member,
the first shaft support portion is located on a first side in the axial direction, which is one side in the axial direction, with respect to the pinion gears, and supports shafts of the plurality of pinion gears,
the carrier includes a second shaft support portion,
the second shaft support portion is located on a second side in the axial direction, which is the other side in the axial direction, with respect to the pinion gears, and supports the shafts of the plurality of pinion gears, the coupling inner portion is located between the first sun gear and the second sun gear in the axial direction, the carrier and the carrier coupling portion are formed so that the pinion gears can be inserted between the first shaft support portion and the second shaft support portion in the axial direction from outside in the radial direction, the output gear is disposed on an opposite side in the axial direction of the first sun gear from the second sun gear, and is coupled to the first sun gear, and the chain is disposed adjacent to the carrier or the carrier coupling portion in the axial direction.

2. The planetary gear mechanism according to claim 1, wherein the carrier and the carrier coupling portion are formed so as not to overlap the pinion gears as viewed in the radial direction in a range in the radial direction from an end on the outer side in the radial direction of the pinion gear to a position located away from this end toward the outer side in the radial direction by at least a distance equal to a diameter of the pinion gear.

3. The planetary gear mechanism according to claim 2, wherein the carrier coupling portion has an opening formed between the first shaft support portion and the coupling inner portion, and the pinion gears each mesh with the first sun gear or the second sun gear via the opening.

4. The planetary gear mechanism according to claim 2, further comprising:

an output gear; a drive gear disposed on the outer side in the radial direction of the output gear and coupled to an oil pump; and a chain looped around the output gear and the drive gear, wherein the output gear is disposed on an opposite side in the axial direction of the first sun gear from the second sun gear, and is coupled to the first sun gear, and the chain is disposed adjacent to the carrier or the carrier coupling portion in the axial direction.

5. The planetary gear mechanism according to claim 4, wherein only the first sun gear and the second sun gear mesh with the pinion gears, and a driving force transmitted to the second sun gear is transmitted from the second sun gear to the pinion gears, the first sun gear, the output gear, the chain, and the oil pump in this order.

6. The planetary gear mechanism according to claim 1, wherein the carrier is formed in a shape of an annular disc, the second shaft support portion is formed at a plurality of positions in a circumferential direction in the annular disc-shaped carrier, the carrier includes a carrier intermediate portion that is a portion in the circumferential direction between the second shaft support portions adjacent to each other in the circumferential direction, the same number of first shaft support portions as the second shaft support portions are formed at positions in the circumferential direction which correspond to the second shaft support portions, the carrier coupling portion includes a coupling intermediate portion that is a portion in the circumferential direction between the first shaft support portions adjacent to each other in the circumferential direction, and a surface on the first side in the axial direction of the carrier intermediate portion is in contact with a surface on the second side in the axial direction of the coupling intermediate portion.

7. The planetary gear mechanism according to claim 6, wherein the carrier intermediate portion and the coupling intermediate portion are connected by welding.

8. The planetary gear mechanism according to claim 7, wherein the coupling outer portion and the first shaft support portions are located on the first side in the axial direction with respect to the pinion gears, and the coupling intermediate portion is formed to project from the coupling outer portion and the first shaft support portions toward the second side in the axial direction so that the coupling intermediate portion is positioned in the axial direction so as to overlap the coupling inner portion, and the coupling intermediate portion is continuous with the coupling inner portion.

9. The planetary gear mechanism according to claim 7, wherein the second shaft support portions are formed to project from the carrier intermediate portion toward the second side in the axial direction so that the second shaft support portions are located on the second side in the axial direction with respect to the pinion gears.

10. The planetary gear mechanism according to claim 8, wherein the second shaft support portions are formed to project from the carrier intermediate portion toward the second side in the axial direction so that the second shaft support portions are located on the second side in the axial direction with respect to the pinion gears.

11. The planetary gear mechanism according to claim 6, wherein the coupling outer portion and the first shaft support portions are located on the first side in the axial direction with respect to the pinion gears, and the coupling intermediate portion is formed to project from the coupling outer portion and the first shaft support portions toward the second side in the axial direction so that the coupling intermediate portion is positioned in the axial direction so as to overlap the coupling inner portion, and the coupling intermediate portion is continuous with the coupling inner portion.

12. The planetary gear mechanism according to claim 11, wherein the second shaft support portions are formed to project from the carrier intermediate portion toward the second side in the axial direction so that the second shaft support portions are located on the second side in the axial direction with respect to the pinion gears.

13. The planetary gear mechanism according to claim 6, wherein the second shaft support portions are formed to project from the carrier intermediate portion toward the second side in the axial direction so that the second shaft support portions are located on the second side in the axial direction with respect to the pinion gears.

14. The planetary gear mechanism according to claim 6, wherein the carrier coupling portion has an opening formed between the first shaft support portion and the coupling inner portion, and the pinion gears each mesh with the first sun gear or the second sun gear via the opening.

15. The planetary gear mechanism according to claim 6, further comprising:
- an output gear; a drive gear disposed on the outer side in the radial direction of the output gear and coupled to an oil pump; and a chain looped around the output gear and the drive gear, wherein
- the output gear is disposed on an opposite side in the axial direction of the first sun gear from the second sun gear, and is coupled to the first sun gear, and
- the chain is disposed adjacent to the carrier or the carrier coupling portion in the axial direction.

16. The planetary gear mechanism according to claim 15, wherein
- only the first sun gear and the second sun gear mesh with the pinion gears, and
- a driving force transmitted to the second sun gear is transmitted from the second sun gear to the pinion gears, the first sun gear, the output gear, the chain, and the oil pump in this order.

17. The planetary gear mechanism according to claim 1, wherein
- the carrier coupling portion has an opening formed between the first shaft support portion and the coupling inner portion, and the pinion gears each mesh with the first sun gear or the second sun gear via the opening.

18. The planetary gear mechanism according to claim 1, wherein
- only the first sun gear and the second sun gear mesh with the pinion gears, and
- a driving force transmitted to the second sun gear is transmitted from the second sun gear to the pinion gears, the first sun gear, the output gear, the chain, and the oil pump in this order.

* * * * *